US010052991B2

(12) United States Patent
Chen

(10) Patent No.: US 10,052,991 B2
(45) Date of Patent: Aug. 21, 2018

(54) EASY-TO-OPERATE TRAVEL SLEEP BRACKET

(71) Applicant: Jianquan Chen, New Haven, CT (US)

(72) Inventor: Jianquan Chen, New Haven, CT (US)

( * ) Notice: Subject to any disclaimer, the term of this patent is extended or adjusted under 35 U.S.C. 154(b) by 0 days.

(21) Appl. No.: 15/487,973

(22) Filed: Apr. 14, 2017

(65) Prior Publication Data

US 2017/0217344 A1    Aug. 3, 2017

Related U.S. Application Data

(63) Continuation of application No. 14/358,474, filed as application No. PCT/CN2012/084820 on Nov. 19, 2012.

(30) Foreign Application Priority Data

Nov. 21, 2011   (CN) .......................... 2011 1 0372037
Dec. 5, 2011    (CN) .......................... 2011 1 0397943

(51) Int. Cl.
*A47C 7/62*      (2006.01)
*B60N 2/859*    (2018.01)
(Continued)

(52) U.S. Cl.
CPC ................ *B60N 2/859* (2018.02); *A47C 7/38*
(2013.01); *A47C 7/62* (2013.01); *B60N 2/44*
(2013.01); *B60N 2/4858* (2013.01); *B60N 2/90* (2018.02)

(58) Field of Classification Search
CPC .... A47C 7/62; A47C 7/38; A47C 3/00; A47C 1/00; B60N 2/44; B60N 3/004; B60N 2/859; B60N 2/90; B60N 2/4858
(Continued)

(56) References Cited

U.S. PATENT DOCUMENTS 3,764,159 A    10/1973   Grime
3,888,329 A     6/1975   Monaghan
(Continued)

FOREIGN PATENT DOCUMENTS

CN        2259090       8/1997
CN        2590457      12/2003
(Continued)

OTHER PUBLICATIONS

International Search Report issued in PCT/CN2012/084820, dated Feb. 7, 2013, English translation, 11 pages.
(Continued)

*Primary Examiner* — Anthony D Barfield
(74) *Attorney, Agent, or Firm* — Hamre, Schumann, Mueller & Larson, P.C.

(57) ABSTRACT

An easy to operate sleep support frame for travelling is disclosed. The support frame includes a movable and curved chest rod which can move from a passenger's chest to the bottom of the seat; a chest cushion connected with the chest rod; and a headrest connected with the chest rod. The headrest can be placed in the back of the front seat or above the chest rod. The chest rod includes a circular arc segment with meshing gear teeth on the inner circular arc side of the chest rod. One end of the chest rod goes through the driving gear box under the seat to be driven by a driving gear box. The passenger can press a button to drive motors to raise chest cushion, and press the button to lower the chest cushion to be close to the seat bottom if the chest cushion is not used.

10 Claims, 9 Drawing Sheets

(51) Int. Cl.
*B60N 2/48* (2006.01)
*A47C 7/38* (2006.01)
*B60N 2/44* (2006.01)
*B60N 2/90* (2018.01)

(58) Field of Classification Search
USPC .......................................... 297/487, 488, 403
See application file for complete search history.

(56) References Cited

U.S. PATENT DOCUMENTS

| | | | |
|---|---|---|---|
| 4,653,809 | A | 3/1987 | Czernakowski et al. |
| 5,720,522 | A | 2/1998 | Habeck |
| 5,762,402 | A | 6/1998 | Gillotti |
| 6,619,733 | B2 | 9/2003 | Pearson |
| 7,748,064 | B2 | 7/2010 | Hamilton |
| 9,084,486 | B1 | 7/2015 | Richardson et al. |
| 2013/0106163 | A1 | 5/2013 | Purpura et al. |

FOREIGN PATENT DOCUMENTS

| | | |
|---|---|---|
| CN | 1513701 | 7/2004 |
| CN | 101513881 | 8/2009 |
| CN | 201423949 | 3/2010 |
| CN | 201442530 | 4/2010 |
| CN | 102514509 | 6/2012 |
| DE | 3116915 | 11/1982 |
| DE | 3130225 | 3/1983 |
| DE | 10008566 | 8/2001 |
| DE | 10200881 | 7/2003 |
| EP | 2 607 152 | 6/2013 |
| FR | 2914245 | 10/2008 |
| KR | 20020015403 | 2/2002 |
| KR | 20080089422 | 10/2008 |
| WO | 2004/084671 | 10/2004 |

OTHER PUBLICATIONS

Office Action issued in corresponding U.S. Appl. No. 14/358,474, dated Jun. 27, 2016, 7 pages.
Office Action for Chinese Patent Application Serial No. 201110397943.9 dated Jan. 30, 2013, Chinese only, 5 pages.
Office Action for Chinese Patent Application Serial No. 201310279380.2 dated Mar. 11, 2016, Chinese only, 4 pages.
Office Action for Chinese Patent Application Serial No. 201310279335.7 dated Apr. 13, 2016, Chinese only, 5 pages.

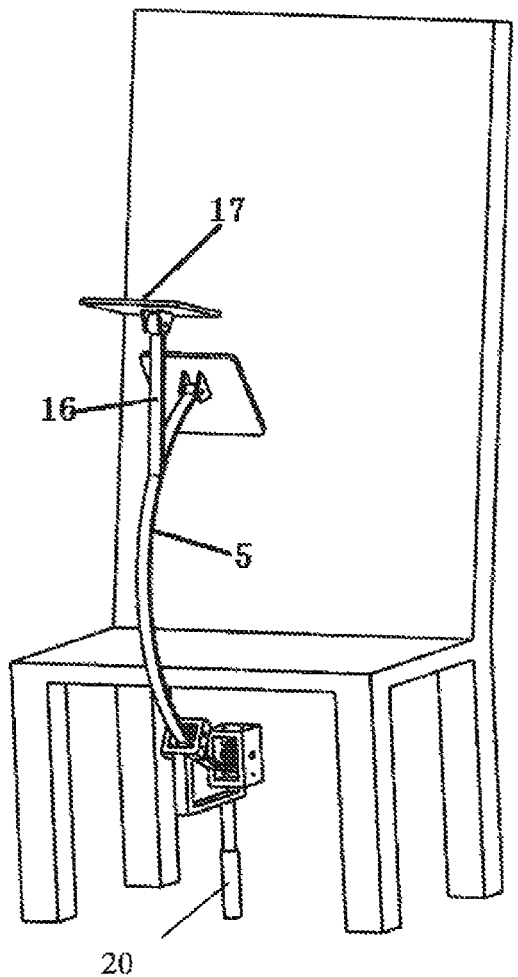
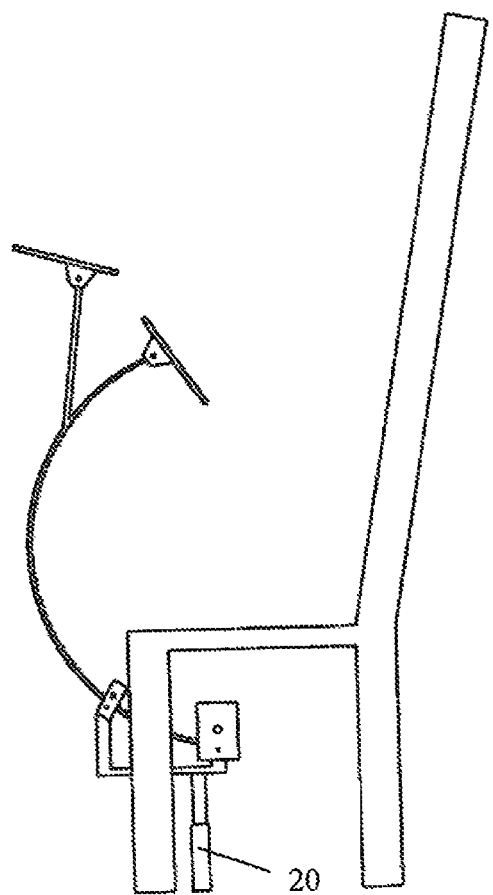
Fig. 4
Fig. 5

EASY-TO-OPERATE TRAVEL SLEEP BRACKET

FIELD OF THE INVENTION

This invention relates to a sleep support frame, especially a kind of easy to operate sleeping supporting frame for travelling.

BACKGROUND OF THE INVENTION

Chinese Patent 200910080007 publishes a sleep support frame for travelling to help passenger sleep on the coach seat on the train, but to operate it is relative complicated and its installation needs lots of steps. It cannot meet the passengers' requirement because of these disadvantages.

SUMMARY OF THE INVENTION

The aim of this invention is to provide an easy to operate sleep support frame for travelling, which can help passenger sleep or rest better on the coach seat in train, airplane and bus.

To achieve this goal, the following technical scheme is used in this invention:

It includes a movable and curved chest rod which can move from the passenger's chest to the bottom of the seat; and a chest cushion which is a plank and connected with the chest rod; and a headrest which is a plank, connected with the chest rod and placed in the back of the seat which is in front of the passenger or above the chest rod.

The chest rod includes a circular arc segment. Meshing gear teeth are on one side of said chest rod. Meshing gear teeth are on the inner circular arc side of the chest rod which is like circular arc; and the other end of the chest rod goes through the driving gear box under the seat; a driving gear is placed in the driving gear box and its teeth fit the meshing gear teeth of the chest rod; rolling wheels are placed on both sides of the driving gear; a rolling wheel to support the chest rod is placed on the outer circular arc side of the chest rod.

A driven gear box is placed in front of said driving gear box; a driven gear is placed in the driven gear box and the teeth of the driven gear fit the meshing gear teeth of the chest rod; rolling wheels are placed on both sides of the driven gear; a rolling wheel to support the chest rod is placed on the outer circular arc side of the chest rod. The driving gear is connected with the axle of a driving motor; the driving motor is controlled by controller. The height of said driving gear box and driven gear box is controlled by the hydraulic extensible pipes under them.

The following is another technical scheme:

It includes a chest cushion which is a plank; an extensible chest rod is connected with the bottom of the chest cushion, the extensible chest rod stays on the back, close to or under the seat in front of the passenger after it is pulled back; a headrest which is a plank is placed on the back of the seat in front of the passenger, or above the extensible chest rod and connected with the chest rod.

An extensible chest rod is attached to the back of the seat in front of the passenger by magnet, snap-fit or hook & loop fastener after it is pulled back.

The extensible chest rod is hydraulic. The extensible chest rod is slid into under the seat through rail after it is pulled back. The angle between said extensible chest rod and the ground is adjusted by a hydraulic extensible pipes connected with them. The ground end of the extensible chest rod is connected to the ground or other parts connected to ground by hinge.

The advantages of this invention are: passenger doesn't need to assemble, just press buttons to drive motors to raise chest cushion, the chest of the passenger is placed against the chest cushion by leaning body, his head is rested on the headrest, then sleep comfortably; if the passenger doesn't want to sleep, he can press button to lower the chest cushion to be close to the seat bottom, the chest cushion will not impede the movement of the passengers. In addition the length adjustment of the chest rod is gradual, so that it is easy for user to find the most comfortable position.

BRIEF DESCRIPTION OF THE DRAWINGS

FIG. 4 is the structure drawing for embodiment 2.
FIG. 5 is the side view for embodiment 2.

DETAIL DESCRIPTION OF THE INVENTION

Figure 1:
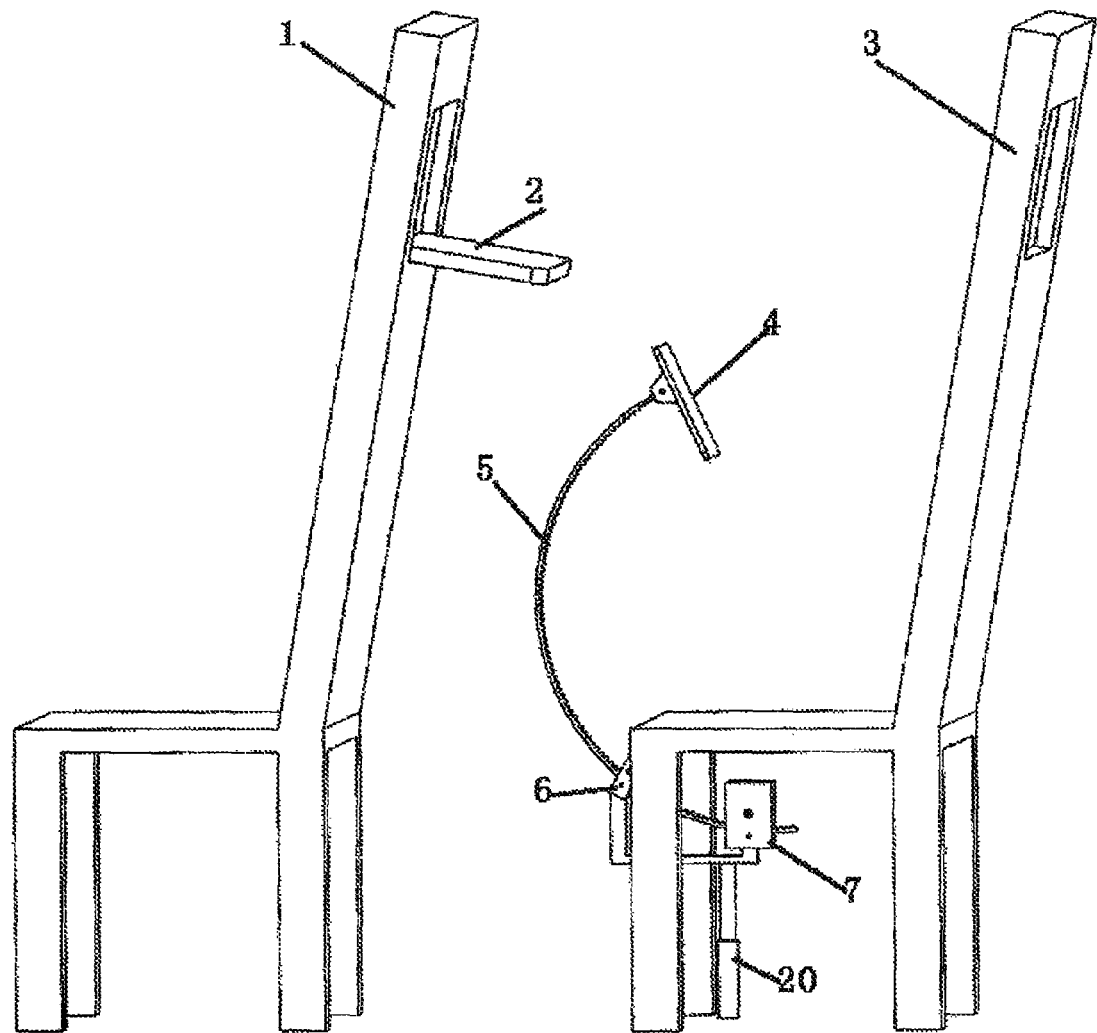
FIG. 1 is the structure drawing for embodiment 1.
Figure 2:
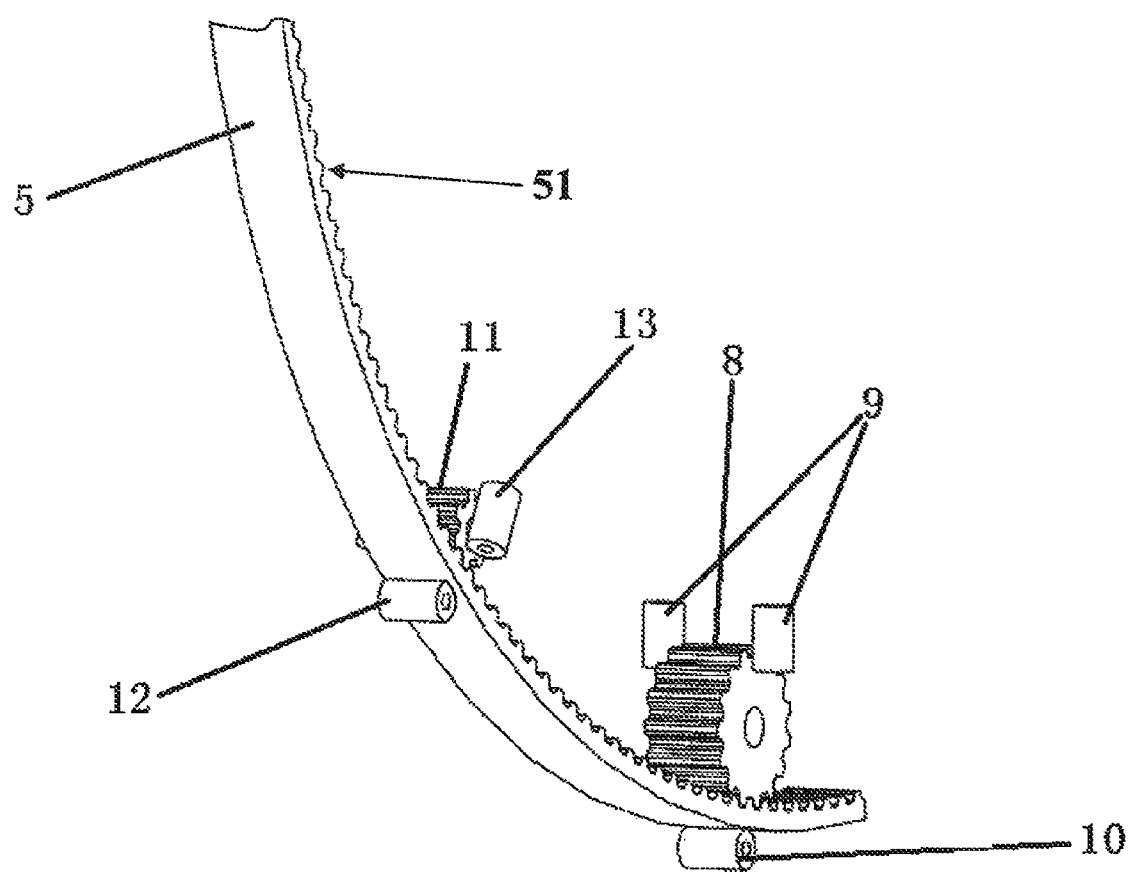
FIG. 2 is the drawing for the chest rod and gears when the gear box is hidden
Figure 3:
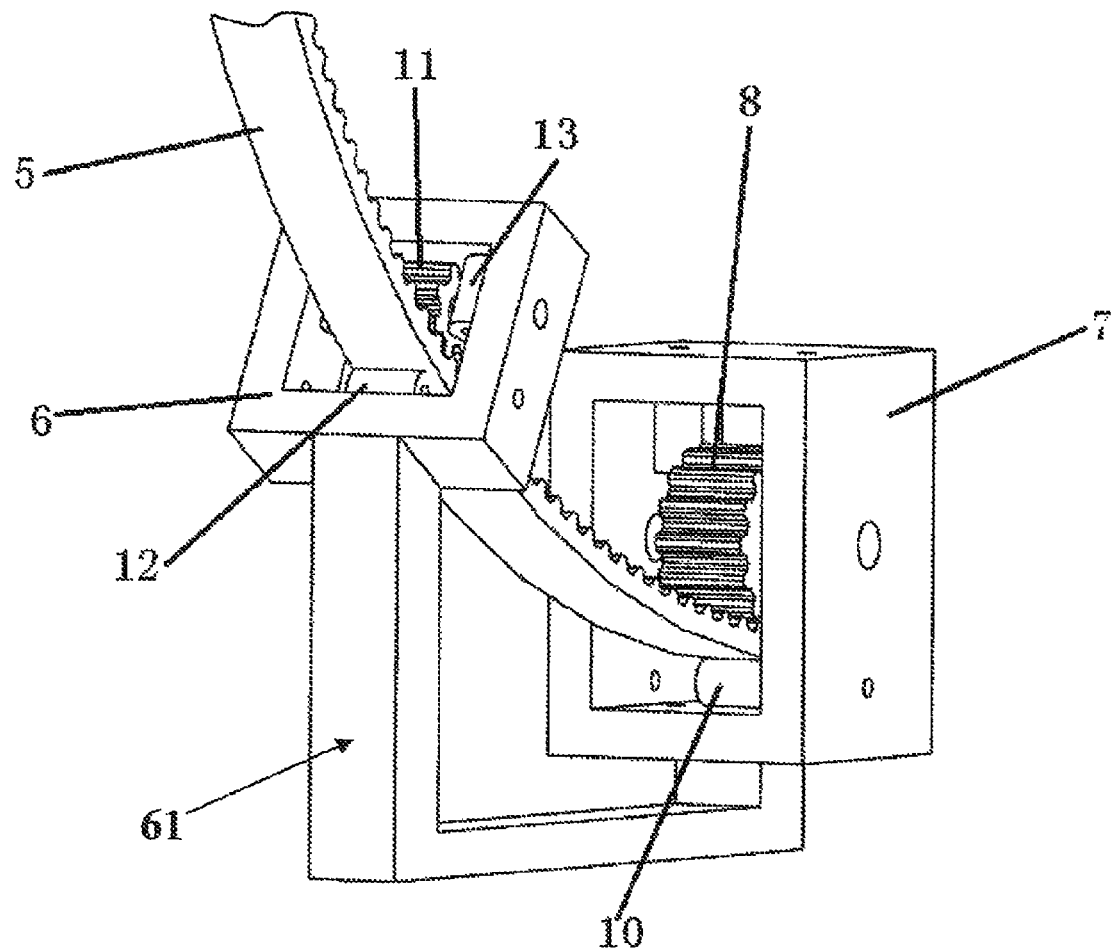
FIG. 3 is a drawing for the chest rod, gears and gear boxes when the gear box is not hidden
Figure 6:
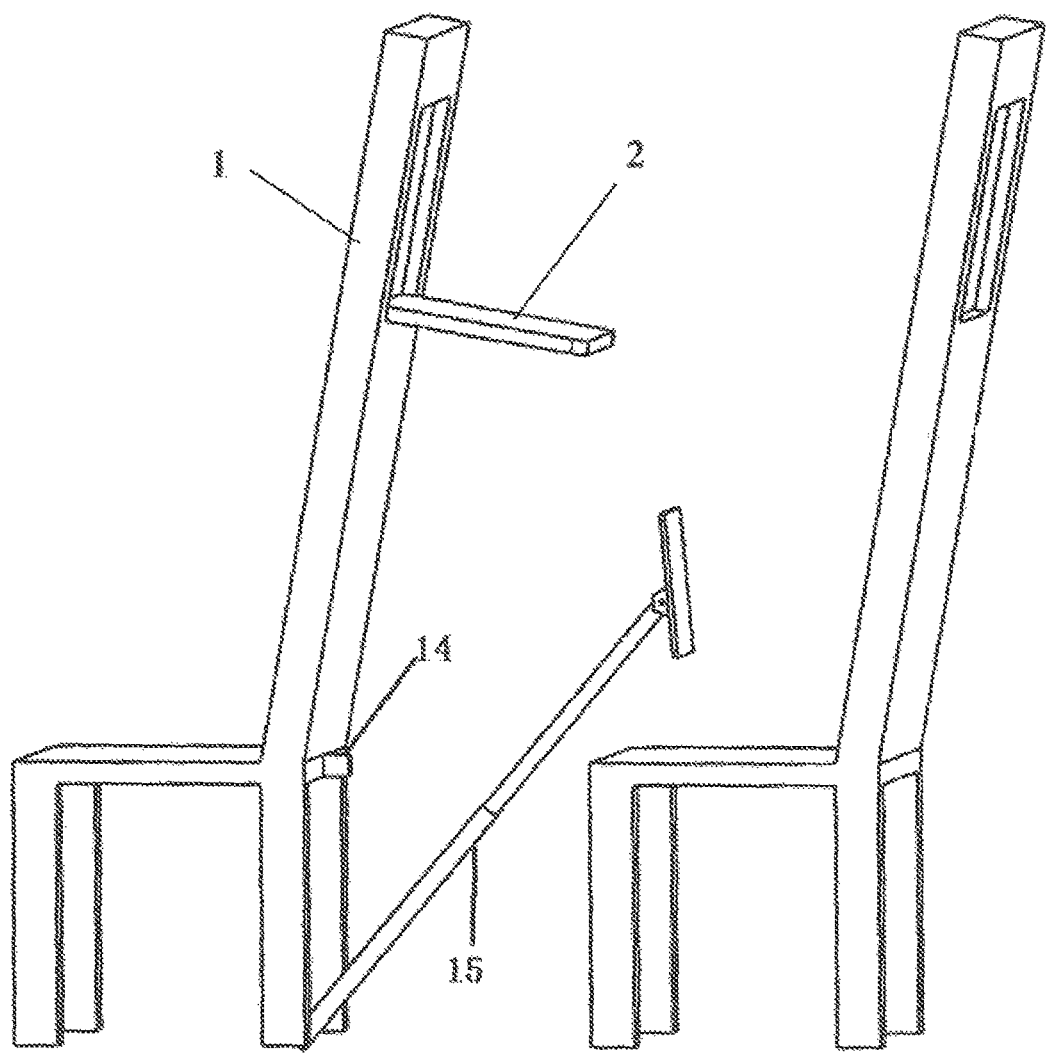
FIG. 6 is the drawing for embodiment 3 when it is being used.
Figure 7:
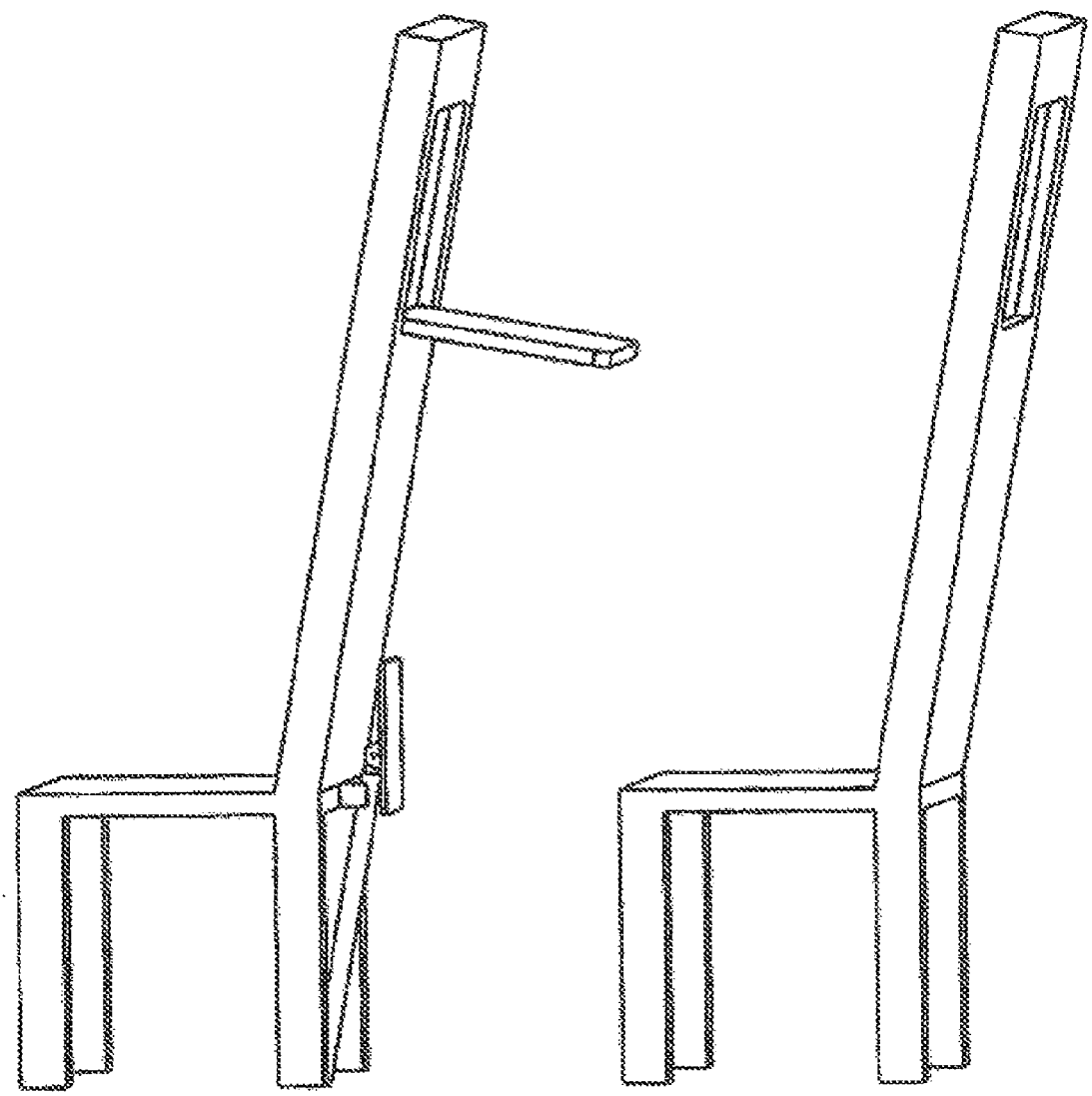
FIG. 7 is the drawing for embodiment 3 when it is stored.

Referring to FIG. 1, FIG. 2 and FIG. 3, an easy to operate sleep support frame for travelling (Embodiment 1) includes:
a movable and curved chest rod 5; and a chest cushion 4 which is a plank and is connected with the chest rod 5; and a headrest 2 which is a plank and is placed in the back of the seat which is in front of the passenger. The chest rod 5 includes a circular arc segment; meshing gear teeth 51 are on one side of the chest rod 5. The meshing gear teeth 51 are on the inner circular arc side of the chest rod 5 which is like circular arc; the other end of the chest rod 5 goes through the driving gear box 7 under the seat 3; a driving gear 8 is placed in the driving gear box 7 and its teeth fit the meshing gear teeth 51 of the chest rod 5; rolling wheels 9 are placed on both sides of the driving gear 8; a rolling wheel 10 to support the chest rod 5 is placed on the outer circular arc side of the chest rod 5. A driven gear box 6 is placed in front of the driving gear box 7. There is a driven gear 11 in the driven gear box 6 and the teeth of the driven gear 11 fit the meshing gear teeth 51 of the chest rod 5; rolling wheels 13 are placed on both sides of the driven gear 11; a rolling wheel 12 to support the chest rod 5 is placed on the outer circular arc side of the chest rod. Rolling wheel 12, 10 can reduce the friction force to the chest rod 5 when the chest rod 5 is moving.

There is a connector 61 to fix the relative positions between driving gear box 7 and driven gear box 6.

Referring to FIG. 4 and FIG. 5 (Embodiment 2):

Head rod 16 is connected on the upper side of the chest rod 5. Head rest 17 is connected to the upper end of the head rod 16. The axle of driving gear 8 is connected with the axle of the driving motor; the driving motor is controlled by a controller.

The height of the driving gear box and the driven gear box is adjusted by the hydraulic pipes 20 under the two boxes.

Referring to FIGS. 6, 7, 8 and 9 for Embodiment 3:

An easy to operate sleep support frame for travelling (Embodiment 3) includes a chest cushion, which is a plank; an extensible chest rod 15 which is connected to the bottom of the chest cushion, and the lower end of the extensible chest rod 15 is connected to the ground or the seat in front of the user;

The headrest 2, which is a plank, is attached to the back of the seat 1 which is in front of the user. The extensible chest rod 15 stays on the back, close to or under the seat 1 in front of the passenger after it is pulled back; the extensible chest rod 15 is attached to the back of the seat 1 in front of the passenger by magnet, snap-fit part 14, and hook & loop fastener after it is pulled back.

The extensible chest rod 15 can be hydraulic extensible pipes.

If there are iron parts in the chest cushion or the extensible chest rod 15, the snap-fit part can be replaced by a magnet. The magnet can attract the rod 15 or chest cushion such that the chest rod or chest cushion will not fall.

Figure 8:
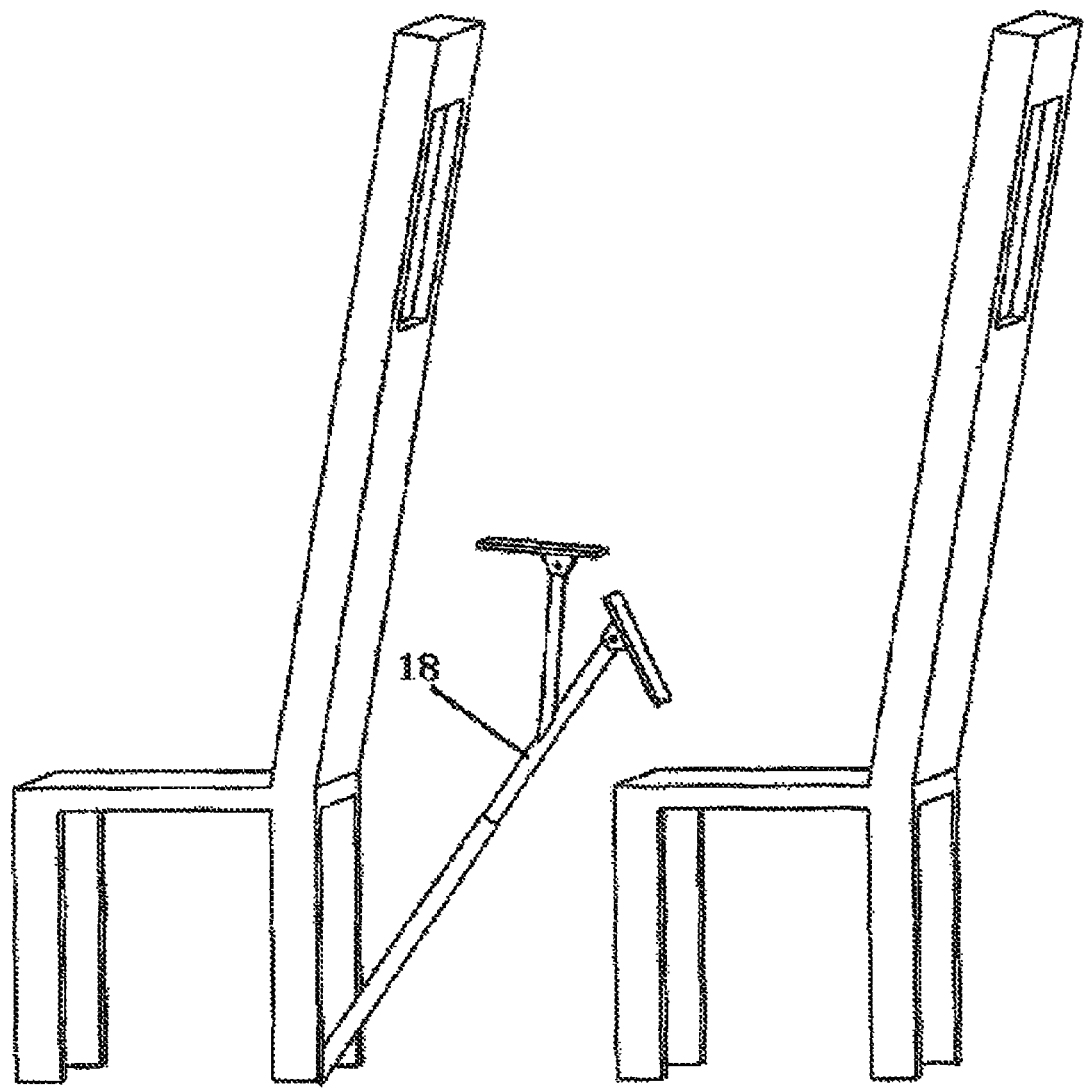
FIG. 8 is the drawing for embodiment 4 when it is being used.

Referring to FIG. 8 (Embodiment 4):

Head rod is connected to the upper side of the upper chest rod 18, the headrest is connected to the upper end of the head rod.

Figure 9:
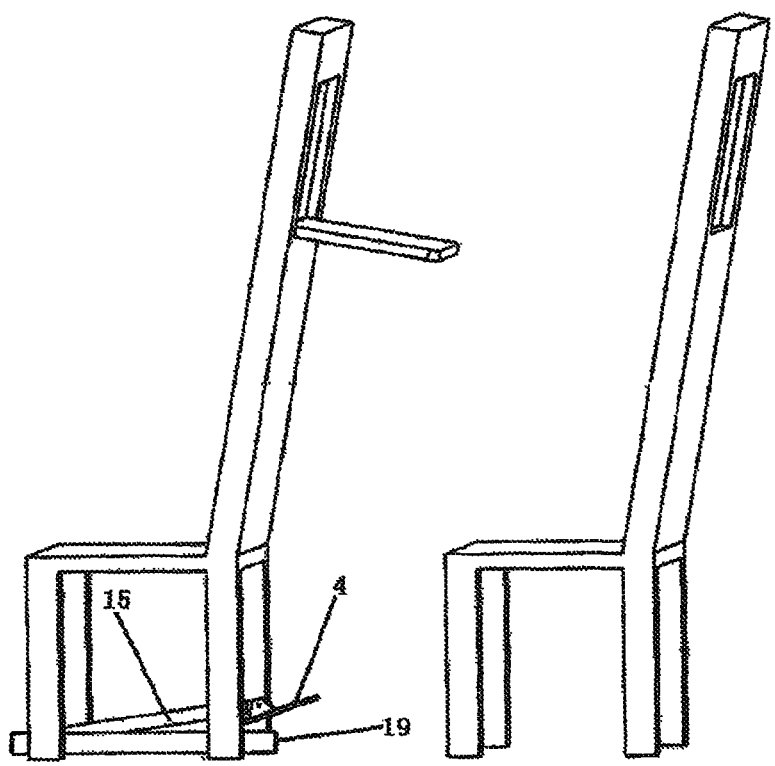
FIG. 9 is the drawing for embodiment 5 when it is stored.
Figure 10:
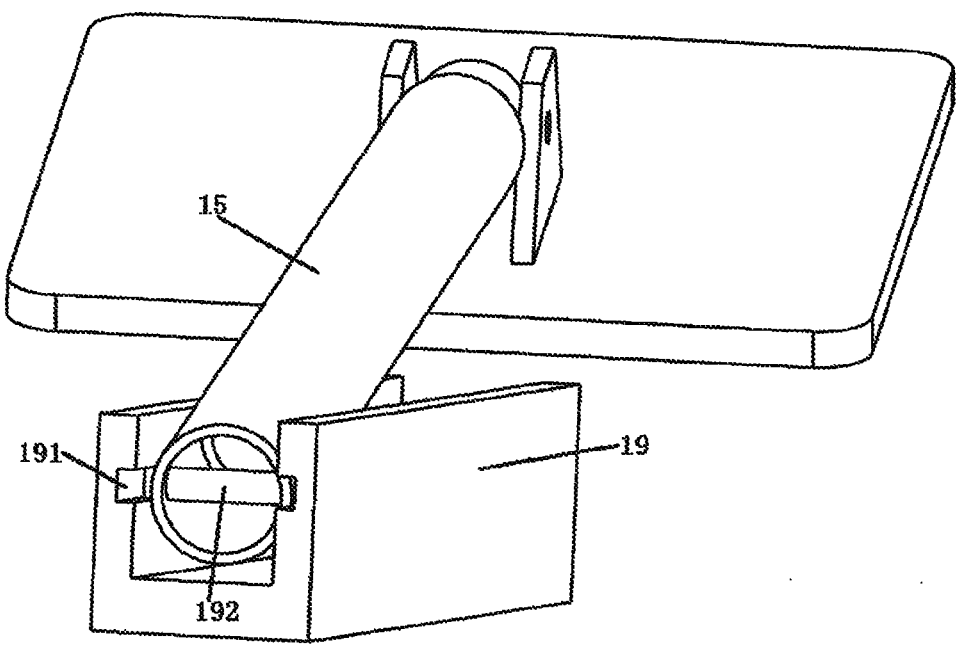
FIG. 10 is the drawing for the guard rail with sliding channel.

Referring to FIGS. 9 and 10 (Embodiment 5):

A guard rail 19 with sliding channel 191 is placed under the seat in front of the passenger; after the extensible chest rod 15 is pulled back, the end with pin 192 on the chest rod 15 slides through the sliding channel 191 of guard rail 19, bring the extensible chest rod 15 to under the seat for storage.

Figure 11:
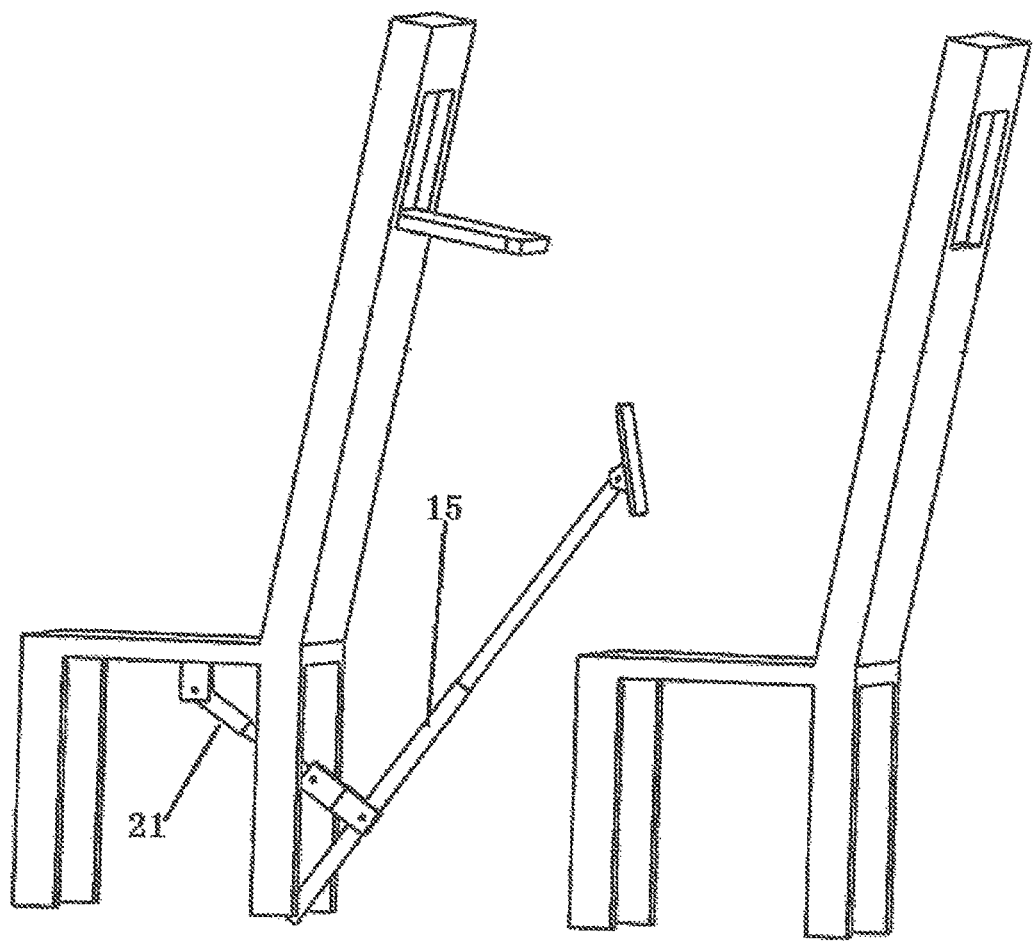
FIG. 11 is the drawing for embodiment 6 when it is being used.

Referring to FIG. 11 (Embodiment 6):

The angle between the ground and extensible chest rod 15 is controlled by the hydraulic extensible pipe 21 connected with chest rod 15. The chest rod 15 is hinge-jointed with ground. The shortened chest rod 15 will slay close to the back of the seat in front of the user after the hydraulic extensible pipe 21 is adjusted to some value, the shortened chest rod 15 will not impede the movement of the passenger.

The ground end of said extensible chest rod 15 is connected to the ground or other parts connected to ground by hinge.

The above described are comparatively excellent embodiments and design schemes, the embodiments and design scheme are used for example, but not to limit the protection scope of the present invention. All embodiments based on the equivalent skills or claims covered by the protection scope of this patent, are inside the protection scope of this patent.

What is claimed is:

1. A system, comprising:
   a seat, the seat including:
      a backrest, a seating surface, a lower seat portion, an upper seat portion, a front portion, and a back portion including the backrest, the backrest having a front side and a backside;
   a second seat, the second seat including a headrest disposed in a backside of the second seat; and
   a body support system, the body support system including:
      a chest rest; and
      a chest-rest support connected to the chest rest, the chest-rest support operable in a first position for locating the chest rest a first distance in a height direction from the seating surface, and in a second position for locating the chest a second distance in the height direction from the seating surface, the first and second distances being different,
   wherein the chest-rest support includes a first section and a second section, the second section including at least a portion that is located below a bottom of the seating surface, the first section having a length from the second section which is adjustable so as to adjust a distance between the seat surface and the chest rest in the height direction.

2. The system of claim 1, wherein the second section is disposed at a center of the seat in a width direction.

3. The system of claim 1, wherein the headrest includes a folded configuration and an unfolded configuration, and in the folded configuration, the headrest is folded into the backside of the second seat.

4. The system of claim 1, wherein the chest-rest support comprises an arc-shape strut having a first end connected to the chest rest and a second end below the seating surface.

5. The system of claim 4, wherein the arc-shape strut is driven by a gear box located below the seating surface, the gear box configured to adjust the strut length of the arc-shape strut.

6. The system of claim 5, wherein a distance between the seat surface and the chest rest is adjustable depending on a chest position of a person sitting on the seating surface.

7. The system of claim 5, further comprising a hydraulic pipe located between the gear box and a floor surface below the seating surface for adjusting a distance between the gear box and the floor surface.

8. The system of claim 5, further comprising a driving motor connected to gears in the gear box.

9. A system, comprising:
   a seat, the seat including:
      a backrest, a seating surface, a lower seat portion, an upper seat portion, a front portion, and a back portion including the backrest, the backrest having a front side and a backside; and
   a headrest disposed in the backside of the seat, wherein the headrest includes a folded configuration and an unfolded configuration, and in the folded configuration, the headrest is folded into the backside of the seat; and
   a body support system, the body support system including:
      a chest rest; and
      a chest-rest support connected to the chest rest, the chest-rest support operable in a first position for locating the chest rest a first distance in a height direction from the seating surface, and in a second position for locating the chest a second distance in the height direction from the seating surface, the first and second distances being different,
   wherein the chest-rest support includes a first section and a second section, the second section including at least a portion that is located below a bottom of the seating surface, the first section having a length from the second section which is adjustable so as to adjust a distance between the seat surface and the chest rest in the height direction.

10. A system, comprising:
    a seat, the seat including:
       a backrest, a seating surface, a lower seat portion, an upper seat portion, a front portion, and a back portion including the backrest, the backrest having a front side and a backside; and a body support system, the body support system including:
- a chest rest; and
- a chest-rest support connected to the chest rest, the chest-rest support operable in a first position for locating the chest rest a first distance in a height direction from the seating surface, and in a second position for locating the chest a second distance in the height direction from the seating surface, the first and second distances being different,
- wherein the chest-rest support includes a first section and a second section, the second section including at least a portion that is located below a bottom of the seating surface, the first section having a length from the second section which is adjustable so as to adjust a distance between the seat surface and the chest rest in the height direction,
- wherein the chest-rest support comprises an arc-shape strut having a first end connected to the chest rest and a second end below the seating surface, the arc-shape strut is driven by a gear box located below the seating surface, the gear box configured to adjust the strut length of the arc-shape strut, and
- a hydraulic pipe is located between the gear box and a floor surface below the seating surface for adjusting a distance between the gear box and the floor surface.

* * * * *